US012651221B2

(12) United States Patent
Li et al.

(10) Patent No.: US 12,651,221 B2
(45) Date of Patent: Jun. 9, 2026

(54) METHOD AND SYSTEM FOR PREDICTING REGIONAL GAS CONSUMPTION, AND DEVICE AND INTERNET OF THINGS CLOUD PLATFORM

(71) Applicant: ZHEJIANG CANGNAN INSTRUMENT GROUP CO., LTD., Zhejiang (CN)

(72) Inventors: Zhongyang Li, Zhejiang (CN); Xiaoxiao Sun, Zhejiang (CN); Dongjin Yu, Zhejiang (CN); Ming Huang, Zhejiang (CN); Xin Chen, Zhejiang (CN); Boyi Huang, Zhejiang (CN); Chunyi Ye, Zhejiang (CN)

(73) Assignee: ZHEJIANG CANGNAN INSTRUMENT GROUP CO., LTD., Zhejiang (CN)

( * ) Notice: Subject to any disclaimer, the term of this patent is extended or adjusted under 35 U.S.C. 154(b) by 0 days.

(21) Appl. No.: 19/014,202

(22) Filed: Jan. 8, 2025

(65) Prior Publication Data

US 2025/0148394 A1 May 8, 2025

Related U.S. Application Data

(63) Continuation of application No. PCT/CN2023/125095, filed on Oct. 18, 2023.

(30) Foreign Application Priority Data

Dec. 23, 2022 (CN) .......................... 202211667911.0

(51) Int. Cl.
*G06Q 10/00* (2026.01)
*G06N 3/0442* (2023.01)
(Continued)

(52) U.S. Cl.
CPC ..... *G06Q 10/06315* (2013.01); *G06N 3/0442* (2023.01); *G06N 3/0455* (2023.01); *G06Q 50/06* (2013.01); *G16Y 40/20* (2020.01)

(58) Field of Classification Search
CPC .... G06Q 50/06; G06Q 10/04; G06Q 10/0631; G06Q 10/06315; G06N 3/0455; G06N 3/0442; G16Y 40/20
See application file for complete search history.

(56) References Cited

U.S. PATENT DOCUMENTS

| | | | | |
|---|---|---|---|---|
| 10,559,044 B2 * | 2/2020 | Liptsey-Rahe | ........ | G06Q 50/06 |
| 2020/0004213 A1 * | 1/2020 | Ratti | ...................... | G05B 15/02 |

(Continued)

FOREIGN PATENT DOCUMENTS

| | | | | |
|---|---|---|---|---|
| CN | 111612275 A | * | 9/2020 | ........... G06F 18/214 |
| CN | 113326654 | | 8/2021 | |

(Continued)

OTHER PUBLICATIONS

M M Sachin, "Analysis of energy consumption using RNN-LSTM and ARIMA Model", Journal of Physics: Conference Series (Year: 2020).*

(Continued)

*Primary Examiner* — Brian M Epstein
*Assistant Examiner* — Reham K Abouzahra
(74) *Attorney, Agent, or Firm* — JCIPRNET

(57) ABSTRACT

A method and system for predicting regional gas consumption, and a device and a cloud platform. The future gas consumption of all gas users in an entire region is predicted according to a user-specified region and date; all networked gas users in the region are extracted during a prediction process by using spatial address matching technology; and then, by means of classifying the users and sampling the users in combination with statistics, representative sample (Continued)

users are extracted from all the users for respective prediction, thereby reducing the computation amount and computing resource consumption, which are required for model prediction. The method and system is mounted on a cloud platform, and the cloud platform receives, by means of Internet of Things technology, gas flow data that is uploaded by gas flow metering devices of all networked gas users, and also provides an interface for interacting with the users for the outside.

14 Claims, 2 Drawing Sheets

(51) Int. Cl.

| | | |
|---|---|---|
| *G06N 3/0455* | (2023.01) | |
| *G06Q 10/0631* | (2023.01) | |
| *G06Q 50/06* | (2012.01) | |
| *G16Y 40/20* | (2020.01) | |

(56) References Cited

U.S. PATENT DOCUMENTS

| | | | | |
|---|---|---|---|---|
| 2020/0074570 A1* | 3/2020 | Yu | ............. | G06Q 10/04 |
| 2023/0175914 A1* | 6/2023 | Diven | ............. | G01N 33/0065 73/40.5 A |

FOREIGN PATENT DOCUMENTS

| | | | | | |
|---|---|---|---|---|---|
| CN | 113326654 | A | * | 8/2021 | ........... G06F 18/214 |
| CN | 114021837 | | | 2/2022 | |
| CN | 114021837 | A | * | 2/2022 | ....... G06F 18/23213 |
| CN | 114511135 | | | 5/2022 | |
| CN | 114511135 | A | * | 5/2022 | ............ G06N 3/045 |
| CN | 114049143 | B | * | 7/2022 | ............ G06Q 50/06 |
| CN | 115313364 | A | * | 11/2022 | ............ G06Q 10/04 |
| CN | 116011633 | | | 4/2023 | |
| JP | 2006011715 | | | 1/2006 | |

OTHER PUBLICATIONS

Oussama Laib, "Toward efficient energy systems based on natural gas consumption prediction with LSTM Recurrent Neural Networks", IEEE (Year: 2019).*

"International Search Report (Form PCT/ISA/210) of PCT/CN2023/125095," mailed on Jan. 30, 2024, with English translation thereof, pp. 1-4.

"Written Opinion of the International Searching Authority (Form PCT/ISA/237) of PCT/CN2023/125095," mailed on Jan. 30, 2024, pp. 1-4.

* cited by examiner

METHOD AND SYSTEM FOR PREDICTING REGIONAL GAS CONSUMPTION, AND DEVICE AND INTERNET OF THINGS CLOUD PLATFORM

CROSS-REFERENCE TO RELATED APPLICATION

This application is a continuation of international application of PCT application serial no. PCT/CN2023/125095 filed on Oct. 18, 2023, which claims the priority benefit of China application no. 202211667911.0 filed on Dec. 23, 2022. The entirety of each of the above-mentioned patent applications is hereby incorporated by reference herein and made a part of this specification.

BACKGROUND

Technical Field

The invention belongs to the field of data prediction, and specifically relates to a method and system for predicting regional gas consumption, a device, and an Internet of Things cloud platform.

Description of Related Art

Natural gas is a fuel energy widely used in cities. The demand for gas is significant both in the civil and industrial sectors. Therefore, the safe operation and stable supply of natural gas are crucial to the normal operation of daily urban functions.

However, the consumption of natural gas, like that of electricity, has obvious volatility, which can be reflected in long-term volatility and short-term volatility. The long-term volatility may be measured in months or quarters, and different seasons and temperatures will lead to differences in gas consumption. The short-term volatility may be measured in one or several days, and there are obvious differences in gas consumption during the day, at night, and at different times of the day.

Therefore, in order to improve the stability of natural gas supply, it is necessary to strengthen gas scheduling, operation, and management in a region. Natural gas scheduling in a city requires centralized monitoring and command of the city's natural gas supply system. In order to achieve a balance between natural gas supply and demand, ensure safe supply, and maintain optimal operating conditions and economic operation, generally, the city natural gas scheduling center collects information on gas sources, transmission, distribution, and application, organizes, analyzes, predicts, and judges the data, and then issues instructions for production, transmission, distribution, and operation. However, in this scheduling process, predicting the future natural gas consumption of a city or a specific region within a city is a long-standing difficulty. The conventional approach is to make estimates based on experiences and data from previous years, but this approach is highly subjective and its accuracy is difficult to control.

With the continuous development of machine learning, at present, the industry is gradually beginning to apply machine learning algorithms such as neural networks to learn gas consumption characteristics and to achieve predictions. However, natural gas consumption is diverse, and different gas users have different gas consumption habits, so the same model often fails to accurately predict the gas consumption of different users. Further, when conducting natural gas scheduling, what needs to be predicted is often not the future gas consumption of a single gas user, but the total gas consumption of all gas users in a specific region. Therefore, if it is necessary to predict gas consumption for a city or region with a population of tens of thousands, according to traditional machine learning approach, a model is built for each gas user and predictions are made separately and then are added up. The computation amount required and the computing resources consumed will far exceed the acceptable load. Further, even if a large amount of computing resources are called upon to ensure the prediction work, due to the large amount of calculation, the real-time performance of this approach will be poor and it will be difficult to meet the actual needs of scheduling.

Therefore, how to optimize the regional gas consumption prediction to meet the requirements of computation amount and real-time performance is a technical problem that needs to be urgently solved.

SUMMARY

The invention aims to solve the problems found in the related art and provide a method and system for predicting regional gas consumption, a device, and a cloud platform.

The specific technical solutions adopted by the invention are provided as follows.

In the first aspect, the invention provides a method for predicting regional gas consumption, and the method includes the following steps.

In S1, a user-specified target region, in which gas consumption needs to be predicted, and a prediction date are acquired.

In S2, according to the target region, spatial position matching is performed on all gas users on the basis of positions corresponding to all networked gas users, so as to obtain a set of gas users which are located in the target region.

In S3, on the basis of category labels of all the networked gas users that are stored in a database in advance, by means of querying, a category label of each gas user from among the set of gas users is obtained. The category labels of the gas users in the database are generated in advance by clustering gas consumption characteristics of all networked gas users. The gas consumption characteristics are composed of a first gas consumption distribution sequence on weekdays and a second gas consumption distribution sequence on holidays of the gas users. All newly added networked gas users need to be assigned corresponding category labels through clustering in the database.

In S4, all the gas users in the set of gas users are divided into several user subsets according to the category labels, where the gas users from among each user subset have the same category label; and then, sampling is performed on the gas users from among each user subset, so as to accordingly obtain, for each user subset, a sample user set which is capable of representing the entire user subset.

In S5, for each sample user set, according to the category label corresponding thereto, a gas consumption prediction model, which is constructed and trained for this type of gas user, is called, so as to obtain a gas consumption prediction value of each sample user from among the sample user set on the prediction date. The gas consumption prediction model is a Seq2Seq model based on a LSTM recurrent neural network model, its input is a time information encoding day sequence for multiple consecutive days before the prediction date, and its output is the gas consumption prediction value on the prediction date. The time information encoding day sequence of any day is formed by fusion of a gas consumption distribution sequence of that day, first encoding information of which day of the week that day belongs to, and second encoding information of whether that day is a holiday.

In S6, the gas consumption prediction values of all sample users from among each sample user set on the prediction date are averaged, a mean value is multiplied by the total number of gas users from among the user subset that corresponds to the sample user set, so as to obtain a total gas consumption prediction value of all gas users from among each user subset, the total gas consumption prediction values of all user subsets are summed up, and by means of prediction, total gas consumption of all gas users in the target region on the prediction date is obtained.

As a preferred embodiment of the first aspect, in S1, the target region and the prediction date are input or specified through a GUI interface capable of human-computer interaction. The target region is designated by administrative division or by free selection on a map interface.

As a preferred embodiment of the first aspect, in S2, when matching the set of gas users located in the target region, spatial topological calculation is required to be performed on point features corresponding to the positions of all gas users and a surface feature corresponding to the target region. The point features intersecting with the surface feature are the gas users located in the target region.

As a preferred embodiment of the first aspect, in S3, the clustering is implemented using a K-means clustering algorithm, and before clustering, the gas consumption distribution sequences of each gas user on all non-holidays are averaged. The gas consumption distribution sequences of each gas user on all non-holidays are averaged. The two average sequences are concatenated to serve as a distance characteristic of the gas users and are used to calculate a distance value between the gas users and a clustering center during a clustering process, so as to classify the gas users into a cluster with a closest distance.

As a preferred embodiment of the first aspect, the gas consumption distribution sequence is obtained by processing original data uploaded to a server by a gas flow metering device based on the Internet of Things technology. Preferably, a time length of the aforementioned gas consumption distribution sequence is 1 day, the sampling interval is 30 minutes to 2 hours, and each sampling value represents the gas consumption of a gas user during a sampling interval.

As a preferred embodiment of the first aspect, the gas consumption prediction model adopts a Seq2Seq model with an encoder-decoder structure. The encoder part adopts a multi-layer first LSTM recurrent neural network model, and the decoder part adopts a single-layer second LSTM recurrent neural network model. An attention layer cascaded between the encoder and the decoder is provided, and a fully connected layer is cascaded after the decoder for output. Input of the first LSTM recurrent neural network model is the time information encoding day sequence for multiple consecutive days before the prediction date. Its model output and hidden layer vector are inputted into the attention layer to generate an attention weight through an attention mechanism. The model output of the first LSTM recurrent neural network model is weighted using the attention weight to obtain the context vector. The context vector is concatenated with the hidden layer vector of the first LSTM recurrent neural network model and inputted into the second LSTM recurrent neural network model. Output of the second LSTM recurrent neural network model is concatenated with the context vector and inputted into the fully connected layer to obtain the gas consumption prediction value on the prediction date as final output of the gas consumption prediction model.

As a preferred embodiment of the first aspect, the sampling method is random sampling, stratified sampling, overall sampling, or systematic sampling.

In the second aspect, the invention provides a computer electronic device including a memory and a processor.

The memory is configured to store a computer program.

The processor is configured to implement the method for predicting regional gas consumption according to any solution of the first aspect when executing the computer program.

In the third aspect, the invention provides an Internet of Things cloud platform. The cloud platform receives, by means of Internet of Things technology, gas flow data uploaded by gas flow metering devices of all networked gas users and also provides an interface for interacting with the users for the outside. The cloud platform stores a computer program and executes the method for predicting regional gas consumption according to any solution of the first aspect when the computer program is executed by a processor.

Compared to the related art, the invention exhibits the following beneficial effects:

1) The invention provides a method and a system through which future gas consumption of all gas users in an entire region can be predicted according to a user-specified region and date. All networked gas users in the region are extracted by using spatial address matching technology in the invention. By means of classifying the users and sampling the users in combination with statistics, representative sample users are extracted from all the users for respective prediction, thereby greatly reducing the computation amount and computing resource consumption, which are required for model prediction.

2) A sequence-to-sequence neural network machine learning model is constructed when predicting the gas consumption of gas users in the invention. The model input combines the gas consumption distribution sequence before the prediction and the time-encoding information. Through model learning, the recent gas consumption changes of gas users can be extracted. Further, combined with date information such as holidays and days of the week that directly affect gas consumption patterns, accurate prediction of future gas consumption can be achieved.

3) The prediction method and system can be applied to prediction made for the overall gas consumption of cities or other regions in advance, thereby meeting the requirements of gas scheduling for gas consumption prediction in the city, and thus ensuring stable gas supply.

DESCRIPTION OF THE EMBODIMENTS

In order to make the above objects, features and advantages of the invention more clearly understood, the specific embodiments of the invention will be described in detail below with reference to the accompanying drawings. In the following description, numerous specific details are set forth in order to provide a thorough understanding of the invention. However, the invention can be implemented in many other ways than those described herein, and a person having ordinary skill in the art can make similar modifications without departing from the meaning of the invention. Accordingly, the invention is not limited by the specific examples disclosed below. The technical features in the various embodiments of the invention may be combined accordingly as long as they do not conflict with each other.

In the description of the invention, it should be understood the terms "first" and "second" are only used for differentiating and descriptive purposes and cannot be understood as indicating or implying relative importance or implicitly indicating the number of indicated technical features.

Figure 1:
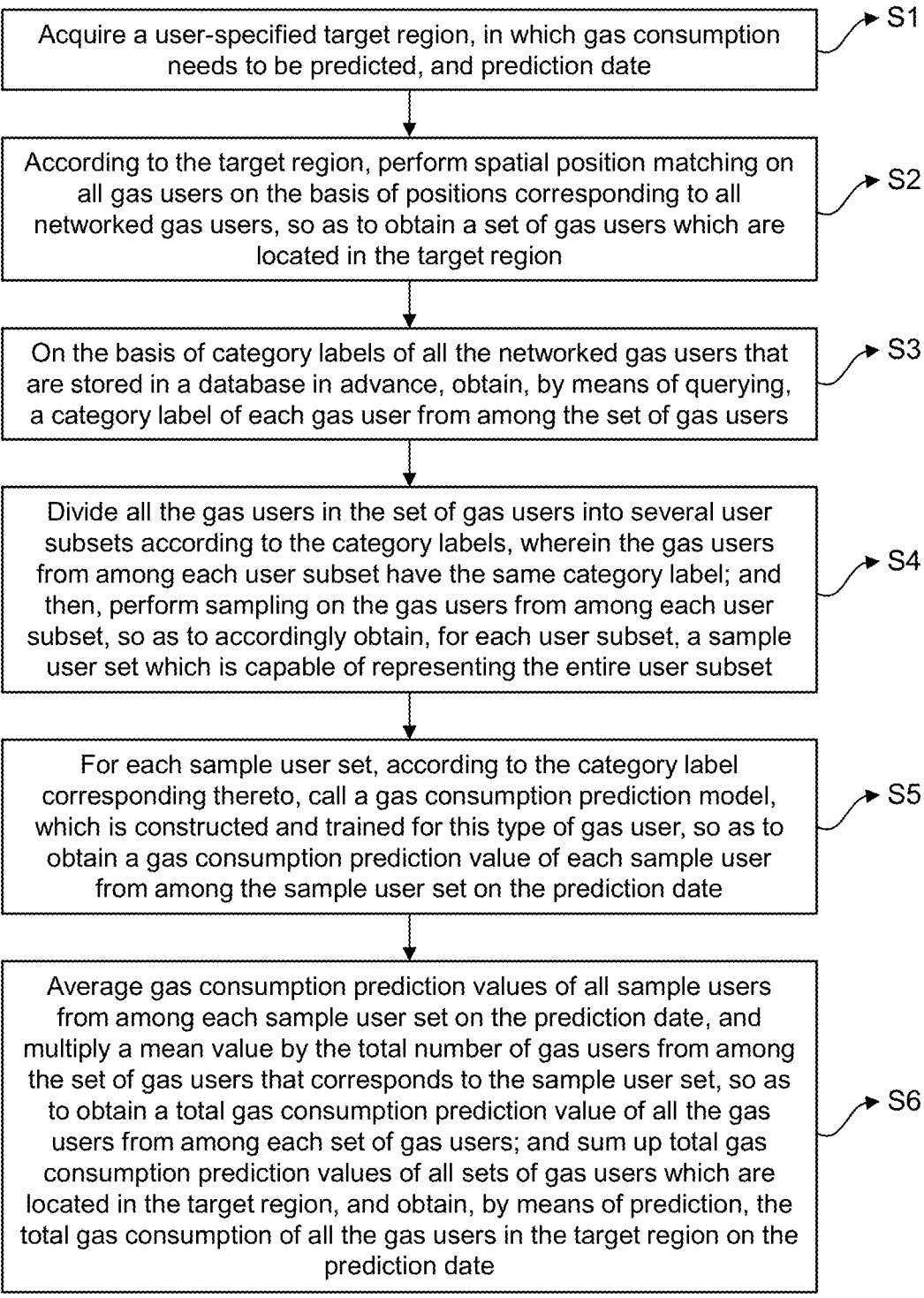
FIG. 1 is a flow chart of steps of a method for predicting regional gas consumption.

In a preferred embodiment of the invention, a method for predicting regional gas consumption is provided. In the method, the future gas consumption of all gas users in the entire region may be predicted according to a user-specified region and date while controlling the computation amount and the computing resource consumption. As shown in FIG. 1, the prediction method specifically includes six steps S1 to S6, and the specific implementation method of each step is described in detail in the following paragraphs.

In S1, a user-specified target region, in which gas consumption needs to be predicted, and a prediction date are acquired.

As an implementation method in the embodiments of the invention, the abovementioned target region and the prediction date are inputted or specified through a GUI interface capable of human-computer interaction. The GUI interface may provide an interactive input function to the outside in the form of a Web page or a local software page. There are many ways to specify the target region, for example, optional administrative divisions of different levels such as province-city-county (district) may be built into the database, and users may directly specify the administrative divisions. Besides, a map interface may be displayed on the GUI interface, and the user may freely select a desired prediction range on the map interface. Therefore, the specifically-adopted method of inputting the target region and the prediction date may be determined according to actual needs.

In S2, according to the target region inputted in S1, spatial position matching is performed on all gas users on the basis of positions corresponding to all networked gas users, so as to obtain a set of gas users which are located in the target region.

It should be noted that the "networked gas users" in the invention refer to gas users connected to a gas pipeline network. All of these gas users may generate possible gas consumption, but only the gas users located in the target region need to participate in the regional gas consumption prediction of the invention. Therefore, it is necessary to determine which gas users are located in the target region through spatial matching, and all gas users located in the target region constitute the set of gas users.

The matching of gas user positions and the target region needs to be determined based on two types of data. As an implementation method in the embodiments of the invention, the positions of the gas users may be matched with the target region by means of spatial topological calculation, and the specific method is as follows. The position of each gas user is mapped on a map as a point feature first, and the target region is mapped on the map as a surface feature. Spatial topology calculation is then performed on the point features corresponding to the positions of all gas users as well as the surface feature corresponding to the target region. The point features intersecting with the surface feature are the gas users located in the target region, so the set of gas users is accordingly obtained.

But the spatial topological calculation is only one possible approach. The way to add a user-specified target region is to specify an administrative region, and the positions of the gas users carry field information of the administrative region to which the gas users belong. As such, all gas users in this administrative region may be directly extracted by field matching to obtain the set of gas users. However, since the user specifies the target region by free selection, it is still more convenient to use spatial topological calculation.

In S3, on the basis of category labels of all the networked gas users that are stored in a database in advance, by means of querying, a category label of each gas user from among the set of gas users is obtained.

The category labels of the gas users in the database are generated in advance by clustering gas consumption characteristics of all networked gas users. The gas consumption characteristics of the users in the invention refer to the time series distribution of gas consumption of the users. The reason for considering gas consumption characteristics for clustering is that different users have obvious differences in gas consumption in different time periods, and it is difficult for a machine learning model to identify such differences. Therefore, all gas users need to be classified in advance, and each type of users with the same gas consumption characteristics may subsequently share one machine learning model. In this way, the accuracy of prediction is improved and the number of machine learning models that need to be trained is decreased.

In the invention, the gas consumption characteristics are composed of a first gas consumption distribution sequence on weekdays and a second gas consumption distribution sequence on holidays of the gas users. The gas consumption characteristics of the gas users are divided into weekday and holiday characteristics and then concatenated; otherwise, directly averaging all date series may make it impossible to distinguish the gas consumption characteristics of weekdays and holidays.

In the embodiments of the invention, for a networked gas user, the user's gas consumption characteristic may be calculated in the following way.

First, a standard condition cumulative flow sequence uploaded by a gas flow meter corresponding to this gas user is obtained. The standard condition cumulative flow sequence records cumulative gas consumption of the gas user at different historical moments. The acquired standard condition cumulative flow sequence is then subjected to data preprocessing, and the preprocessing includes outlier removal, re-sampling, and missing value filling. A standard condition cumulative flow sequence with a fixed interval (preferably 1 hour interval) is obtained, and then a first-order difference operation is performed on this standard condition cumulative flow sequence. The standard condition cumulative flow sequence is converted into a standard condition flow increment sequence, and the standard condition flow increment sequence is recorded as a gas consumption distribution sequence D. The gas consumption distribution sequence D records the increase in gas consumption of the gas user at different historical moments, that is, each sequence value represents the additional gas consumption of the gas user within a fixed interval. For the gas consumption distribution sequence D, daily sequences are extracted from it in units of days, and each sequence is determined to be a weekday or a holiday according to the date. The extracted daily sequences of all weekdays are then averaged, and the obtained average sequence is recorded as the first gas consumption distribution sequence $\overline{D}_1 = (\overline{d}_{t_1}, \overline{d}_{t_2}, \ldots, \overline{d}_{t_h})$ representing the flow consumption characteristics of weekdays, where $\overline{d}_{t_1}, \overline{d}_{t_2}, \ldots, \overline{d}_{t_h}$ represent the average values of h standard flow increments on weekdays. The extracted daily sequences of all holidays are averaged as well to obtain the second gas consumption distribution sequence $\overline{D}_2 = (\overline{d}'_{t_1}, \overline{d}'_{t_2}, \ldots, \overline{d}'_{t_h})$ representing the flow consumption characteristics of holidays, where $\overline{d}'_{t_1}, \overline{d}'_{t_2}, \ldots, \overline{d}'_{t_h}$ represent the average values of h standard flow increments on holidays. Finally, for each gas consumption distribution sequence D, its corresponding $\overline{D}_1$ and $\overline{D}_2$ are concatenated, and the concatenated characteristic $\overline{D} = [\overline{D}_1, \overline{D}_2]$ is treated as a distance characteristic of the gas user corresponding to the gas consumption distribution sequence for clustering. In the embodiments of the invention, clustering may be achieved using the K-means clustering algorithm, and each gas user is a cluster individual in the K-means clustering process. N individuals are selected from all individuals participating in clustering as cluster centers in advance, and then distance values (Euclidean distance can be used) between the remaining gas users and the cluster centers are calculated. In this way, gas users are classified into the cluster with the closest distance, and then the cluster centers are updated, and the iteration continues until convergence. The optimal value of the number N of the cluster centers may be determined according to the silhouette coefficient.

In the invention, the gas consumption distribution sequence may be obtained by processing original data uploaded to a server by a gas flow metering device based on the Internet of Things technology. A time length of the aforementioned gas consumption distribution sequence is 1 day, the sampling interval is 30 minutes to 2 hours, preferably 1 hour, and each sampling value represents the gas consumption of a gas user during a sampling interval. The specific sampling interval granularity needs to be determined based on the quality of data uploaded by the gas flow metering device.

It should be noted that the clustering of gas consumption characteristics of all gas users needs to be completed in advance and the clustered category labels need to be stored in the database for easy calling in the real-time prediction process. Further, the gas users in the gas pipeline network may continue to be added and deleted. Therefore, for newly added gas users in the database, after obtaining corresponding gas consumption data after a period of time after joining the network, these gas users need to be assigned corresponding category labels through clustering. If there are many new gas users joining the network, the K-means clustering process may be performed again on all gas users in the network. If the number of newly added gas users is less, the distance value of the distance characteristic $\overline{D}$ of the newly added gas users may be calculated with the centers of the clusters obtained by clustering, and these gas users may be classified into the cluster with the closest distance and assigned a category label.

In S4, all the gas users in the set of gas users are divided into several user subsets according to the category labels, where the gas users from among each user subset have the same category label; and then, sampling is performed on the gas users from among each user subset, so as to accordingly obtain, for each user subset, a sample user set which is capable of representing the entire user subset.

It should be noted that the main purpose of this step is to reduce the number of users who need to make gas consumption prediction in the entire target region because the gas consumption of each gas user is different, so they need to be predicted separately. However, for the entire region, what needs to be calculated is the total gas consumption, so the purpose of sampling is to extract some samples from all gas users. Sampling technology belongs to the related art. The set of all numerical indicators of the object under investigation may be regarded as the population, and each element constituting the population may be regarded as an individual. A collection of individuals selected from a population is called a sample, and the number of individuals in the sample is called the sample size. For the invention, the population refers to the set of all gas users in the entire target region. The sampling methods available are simple random sampling, stratified sampling, overall sampling, or systematic sampling. Assuming that the number of a population is N, if a sample is drawn one by one and the probability of each individual being drawn is equal each time, this sampling method is simple random sampling. When the population is large, the population is first divided into several balanced parts. According to predetermined rules, some individuals are then selected from each part to obtain the required sample, and this sampling method is called systematic sampling. When sampling, the population is divided into non-overlapping layers, and then a certain number of individuals are independently selected from each layer in a certain proportion to obtain the required sample. This sampling method is called stratified sampling. The overall sampling is a sampling method that combines the units in the population into several non-overlapping and non-repeating sets, called groups, and then samples are extracted using the groups as sampling units. The specific sampling method may be selected according to actual conditions. In the embodiments of the invention, since clustering is performed in advance, the sampling herein preferably adopts simple random sampling.

In addition, the sample size of each user subset may be determined based on the total number of gas users in the entire target region and the computing resources that may be called upon. In principle, the more computing resources that may be called upon, the more accurate predictions may be made for more gas users, and the better the overall average gas consumption may be reflected. However, if the total number of gas users in the entire target region is excessively large and the computing resources that may be called upon are difficult to guarantee, then the sample size in each user subset may be reduced.

In S5, for each sample user set, according to the category label corresponding thereto, a gas consumption prediction model, which is constructed and trained for this type of gas user, is called, so as to obtain a gas consumption prediction value of each sample user from among the sample user set on the prediction date. The gas consumption prediction model is a Seq2Seq model based on a LSTM recurrent neural network model, its input is a time information encoding day sequence for multiple consecutive days before the prediction date, and its output is the gas consumption prediction value on the prediction date. The time information encoding day sequence of any day is formed by fusion of a gas consumption distribution sequence of that day, first encoding information of which day of the week that day belongs to, and second encoding information of whether that day is a holiday.

In the embodiments of the invention, the aforementioned gas consumption prediction model adopts a Seq2Seq model of an encoder-decoder structure, and the Seq2Seq is an important sequence-to-sequence mapping model. The model consists of two parts: the encoder is used to encode sequence information and encodes sequence information of arbitrary length into a context vector, and the decoder is a decoder. After the decoder obtains the context vector, it can decode the information and output it as a sequence. In this embodiment, the encoder part adopts a multi-layer first LSTM recurrent neural network model, and the decoder part adopts a single-layer second LSTM recurrent neural network model. An attention layer cascaded between the encoder and the decoder is provided, and a fully connected layer is cascaded after the decoder for output. Input of the first LSTM recurrent neural network model is the time information encoding day sequence for multiple consecutive days before the prediction date. Its model output and hidden layer vector are inputted into the attention layer to generate an attention weight through an attention mechanism. The model output of the first LSTM recurrent neural network model is weighted using the attention weight to obtain the context vector. The context vector is concatenated with the hidden layer vector of the first LSTM recurrent neural network model and inputted into the second LSTM recurrent neural network model. Output of the second LSTM recurrent neural network model is concatenated with the context vector and inputted into the fully connected layer to obtain the gas consumption prediction value on the prediction date as final output of the gas consumption prediction model.

Long short-term memory network LSTM is a variant of the recurrent neural network model RNN, and its core concepts lie in cell state and gate structure. The cell state is equivalent to the path for information transmission, allowing the information to be passed on in the sequence chain. You can think of it as the network's memory. In theory, the cell state may pass on relevant information during the sequence processing. Therefore, even information from earlier time steps may be carried to cells in later time steps, overcoming the influence of short-term memory. The addition and removal of information is achieved through a gate structure, which learns what information to keep or forget during training. The gate structure in LSTM includes an input gate, an output gate, and a forget gate, among which the input gate and forget gate are the key to LSTM's ability to remember long-term dependencies. The input gate determines how much information about the current state of the network needs to be saved in the internal state, while the forget gate determines how much past state information needs to be discarded. Finally, the output gate determines how much information of the current internal state needs to be outputted to the external state. In a preferred embodiment of the invention, an attention mechanism is introduced to construct a context vector, and the specific structure and training method of this gas consumption prediction model are described in detail in the following paragraphs.

For any category k, a gas consumption prediction model based on the Seq2Seq model is trained using a training set $L_k$ pre-constructed for the category. The encoder and decoder of the Seq2Seq model both use the LSTM recurrent neural network model and introduce the attention mechanism. The specific structure of the model and the training process specifically include the following sub-steps:

In step 1, a sequence $X_t$ in a training sample $[X_t, Y_t]$ is inputted into the encoder of the gas consumption prediction model, the encoder part adopts a unidirectional $L_1$-layer long short-term memory network $LSTM_1$, and the process is expressed as follows:

$$f_t = \sigma\left(W_{f1} \cdot \left[h_{t-1}^{(l)}, X_t\right] + b_{f1}\right)$$

10

-continued $$i_t = \sigma\left(W_{i1} \cdot \left[h_{t-1}^{(l)}, X_t\right] + b_{i1}\right)$$

$$\tilde{C}_t^{(l)} = \tanh\left(W_{C1} \cdot \left[h_{t-1}^{(l)}, X_t\right] + b_{C1}\right)$$

$$C_t^{(l)} = f_t * C_{t-1}^{(l)} + i_t * \tilde{C}_t^{(l)}$$

$$o_{t1} = \sigma\left(W_{o1} \cdot \left[h_{t-1}^{(l)}, X_t\right] + b_{o1}\right), \text{ and}$$

$$h_t^{(l)} = o_{t1} * \tanh\left(C_t^{(l)}\right),$$

where $o_{t1}$ is the output of the $LSTM_1$ model at time t, $$h_t^{(l)}, C_t^{(l)}$$

are the hidden layer outputs of the model at time t, $l \in [1, L_1]$, $W_{f1}$, $W_{i1}$, $W_{C1}$, $W_{o1}$ are learnable parameter matrices, $b_{f1}$, $b_{i1}$, $b_{c1}$, $b_{o1}$ are bias term parameters, and $\sigma$ is the activation function.

In step 2, the output obtained by the encoder part is inputted into the decoder part which consists of a long short-term memory network $LSTM_2$ with the attention layer and a unidirectional $L_2$ layer, and the prediction process in the decoder part is as follows:

In step 21, the output $o_{t1}$ obtained by the encoder part in step 1 and the hidden layer vector $$h_{t-1}^{(L_1)}$$

are used as the input of the attention layer to calculate the attention weight:

$$E_t = \tanh\left(W_Q \cdot \left[h_{t-1}^{(l)}, o_{t1}\right] + b_Q\right) \text{ and}$$

$$a_t = softmax(vE_t),$$

where $a_t$ is the attention weight, $E_t$ is the intermediate quantity, $W_Q$, v is the learnable parameter matrix, and $b_Q$ is the bias parameter.

In step 22, the context vector c is calculated by using the attention weight $a_t$ obtained by the attention layer and the output $o_{t1}$ obtained by the encoder part in S41:

$$c = a_t o_{t1}.$$

In step 23, the context vector c and the hidden layer vector $$h_{t-1}^{(l)}$$

obtained by the encoder part in S41 are concatenated and inputted into the long short-term memory network $LSTM_2$ of the unidirectional $L_2$ layer, and the process is expressed as follows:

$$f_t = \sigma\left(W_{f2} \cdot \left[H_{t-1}^{(l)}, c\right] + b_{f2}\right)$$

$$i_t = \sigma\left(W_{i2} \cdot \left[H_{t-1}^{(l)}, c\right] + b_{i2}\right)$$

$$\tilde{P}_t^{(l)} = \tanh\left(W_{C2} \cdot \left[H_{t-1}^{(l)}, c\right] + b_{C2}\right)$$

-continued $$P_t^{(l)} = f_t * P_{t-1}^{(l)} + i_t * \tilde{P}_t^{(l)}$$

$$o_{t2} = \sigma\left(W_{o2} \cdot \left[h_{t-1}^{(l)}, \, c\right] + b_{o2}\right), \text{ and}$$

$$H_t^{(l)} = o_{t2} * \tanh\left(P_t^{(l)}\right),$$

where $o_{t2}$ is the output of the LSTM$_2$ model at time t, $$H_t^{(l)}, \, P_t^{(l)}$$

are the hidden layer outputs of the model at time t, $l \in [1, L_2]$, $W_{f2}$, $W_{i2}$, $W_{C2}$, $W_{o2}$ are learnable parameter matrices, $b_{f2}$, $b_{i2}$, $b_{c2}$, $b_{o2}$ are bias term parameters, and $\sigma$ is the activation function.

$$H_t^{(1)}$$

in the first layer of long short-term memory network LSTM$_2$ is initialized using $$h_{t-1}^{(L_1)}$$

outputted by the encoder.

In step 24, finally, the output $o_{t2}$ of the long short-term memory network LSTM$_2$ and the context vector c are concatenated and input into the fully connected layer with h hidden layer units to obtain the final prediction result of the gas consumption prediction model:

$$\hat{Y}_t = W_d \cdot [o_{t2}, \, c] + b_d,$$

where $\hat{Y}_t$ is the output of the fully connected layer, that is, the prediction result of the gas consumption distribution sequence at the future moment, $W_d$ is the learnable parameter matrix, and $b_d$ is the bias term parameter.

In step 3, the root mean square error (RMSE) between $Y_t$ and $\hat{Y}_t$ is used as the loss function, and the gas consumption prediction model is iteratively trained using the training set $L_k$. When the iteration termination condition is reached, the training is stopped and the final gas consumption prediction model is outputted to predict the gas flow usage status of gas users belonging to category k.

It should be noted that both the encoder and decoder in the Seq2Seq model adopt the LSTM recurrent neural network model, and the number of LSTM layers may be optimized according to actual conditions. In the embodiments of the invention, the number of layers $L_1$ of the long short-term memory network LSTM$_1$ is 3, and the number of layers $L_2$ of the long short-term memory network LSTM$_2$ is 1.

It should be noted that the training of the Seq2Seq model belongs to the related art, and the training part $L_{train}$ may be used to train the model, and the test part $L_{test}$ may be used to verify the model. The iteration termination condition may be set to reach the maximum number of training rounds or model convergence.

It should be noted that the above steps 1 to 3 are the gas consumption prediction model training process for a single category of gas users. Since there are multiple categories of gas users, it is necessary to train a gas consumption prediction model for each category.

Further, it should be noted that the training set $L_k$ for training the gas consumption prediction model based on the Seq2Seq model may be constructed using the historical data of each category of gas users after the aforementioned clustering. Assuming that the gas consumption prediction model based on the Seq2Seq model takes the gas consumption distribution sequence of w days as input and predicts the gas consumption distribution sequence of the next s days, and the prediction start time is represented as t+w, then a single training sample may be represented as $[X_t, Y_t]$, where $$X_t = \left[D_t + Z_t^1 + Z_t^2, D_{t+1} + Z_{t+1}^1 + Z_{t+1}^2, \ldots, D_{t+w-1} + Z_{t+w-1}^1 + Z_{t+w-1}^2\right],$$

and the predicted sequence is expressed as $Y_t = [D_{t+w}, D_{t+w+1}, \ldots, D_{t+w+s-1}]$, where $w > 1$ and $s \geq 1$. In the above training samples, the gas consumption distribution sequence of any $i^{th}$ day may be expressed as $D_i = [d_{i*h-h+1}, d_{i*h-h+2}, \ldots, d_{i*h}]$, where h is the length of the gas consumption distribution sequence of one day.

$$Z_i^1 \text{ and } Z_i^2$$

represent two time information codes of the $i^{th}$ day, namely, the first encoding information of which day of the week the $i^{th}$ day belongs to and the second encoding information of whether the $i^{th}$ day is a holiday. Both $$Z_i^1$$

and $$Z_i^2$$

may be generated by one-hot encoding. Further, in the above encoding process, the first encoding information $$Z_i^1$$

and the second encoding information $$Z_i^2$$

need to be encoded to the same length as $D_i$ to facilitate fusion.

When constructing the above training samples, the length of the input sequence and the length of the prediction sequence may be optimized according to actual conditions. In the embodiments of the invention, w=7 and s=1 are set after optimization, that is, the daily sequence of the previous 7 days is used to predict the daily sequence of the next day. Once the day sequence of the prediction date is obtained, the gas consumption of the prediction date may be obtained.

Certainly, in actual applications, the prediction date may also be multiple days and is not limited to a single-day prediction.

In S6, the gas consumption prediction values of all sample users from among each sample user set on the prediction date are averaged, a mean value is multiplied by the total number of gas users from among the user subset that corresponds to the sample user set, so as to obtain a total gas consumption prediction value of all gas users from among each user subset, the total gas consumption prediction values of all gas users in all user subsets are summed up, and by means of prediction, total gas consumption of all gas users in the target region on the prediction date is obtained.

It should be noted that to calculate the total gas consumption of all gas users in the target region, it is necessary to first calculate the total gas consumption of all sample users from among each user subset and then add them up. According to the principle of sampling, since the sample user set obtained by sampling may represent the overall situation of the entire user subset, the average value of gas consumption of all users in the sample user set obtained by sampling may also represent the average value of gas consumption of all users in the entire user subset. Therefore, the total gas consumption of all sample users in a single user subset may be converted and obtained. The total gas consumption of the target region may be obtained by summing up the total gas consumption of all user subsets included in the set of gas users located in the target region.

Figure 2:
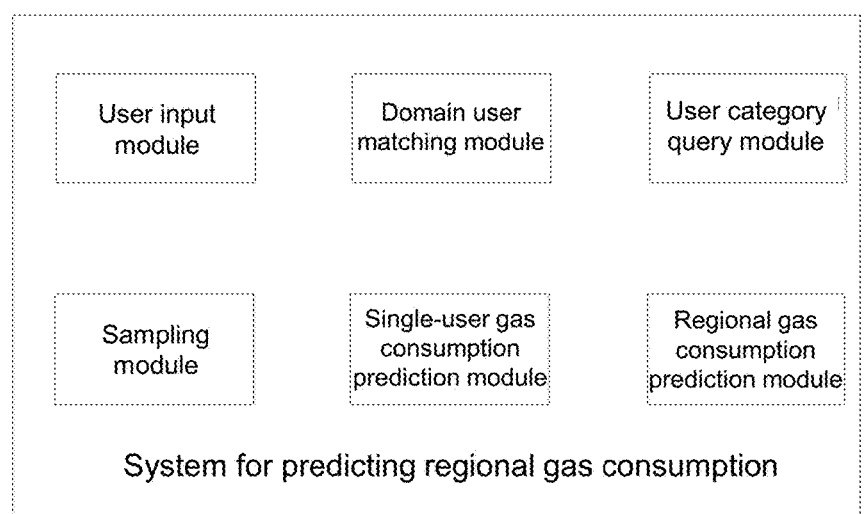
FIG. 2 is a schematic view of modules forming a regional gas consumption prediction system.
Figure 3:
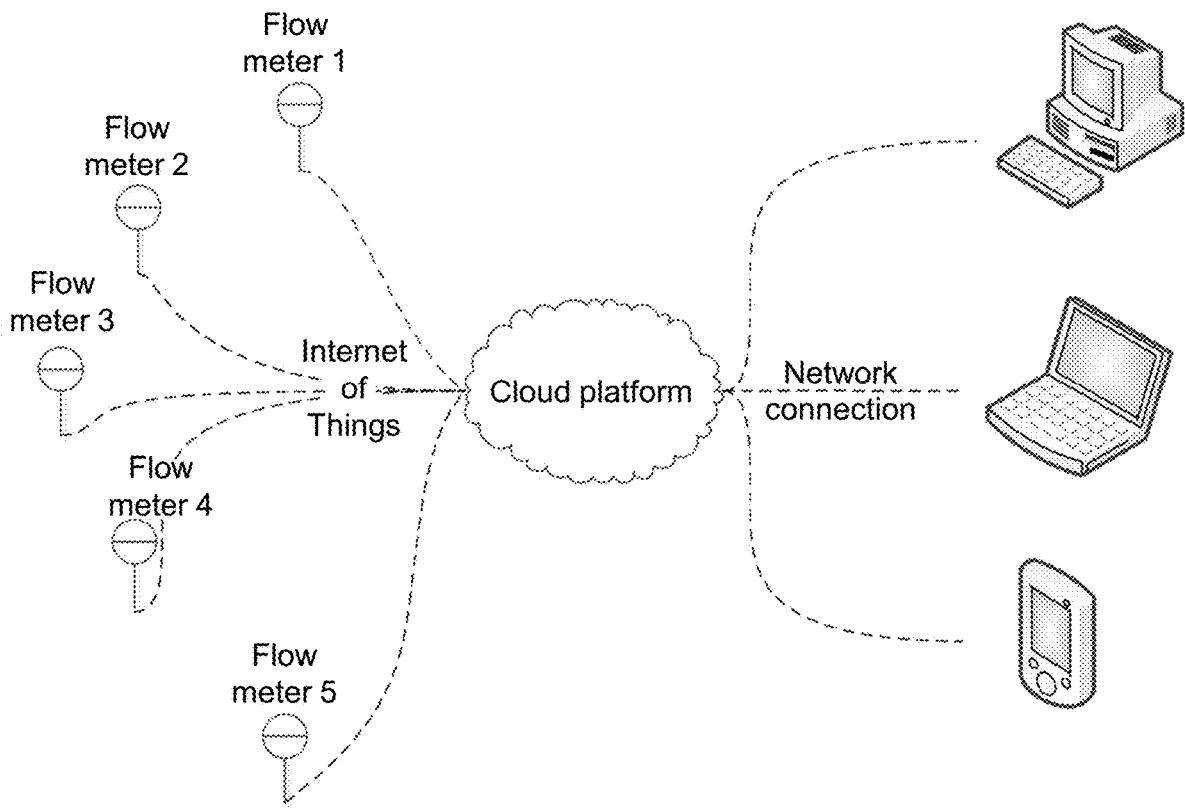
FIG. 3 is a schematic diagram of an Internet of Things cloud platform.

In addition, based on the same inventive concept as the method for predicting regional gas consumption provided in the above embodiments, another preferred embodiment of the invention provides a system for predicting regional gas consumption. As shown in FIG. 2, the prediction system includes a user input module for implementing the abovementioned step S1, a domain user matching module for implementing the abovementioned step S2, a user category query module for implementing the abovementioned step S3, a sampling module for implementing the abovementioned step S4, a single-user gas consumption prediction module for implementing the abovementioned step S5, and a regional gas consumption prediction module for implementing the abovementioned step S6. The principle of solving the problem by the above method for predicting regional gas consumption is similar to that of the system for predicting regional gas consumption in the above embodiments of the invention. Therefore, for any details not covered in detail in the specific implementation forms of the modules of the system in this embodiment, please refer to the specific implementation forms of the method parts shown in S1 to S6 in the above paragraphs, and description of the repeated parts is not provided.

Similarly, based on the same inventive concept, another preferred embodiment of the invention also provides a computer electronic device corresponding to the system for predicting regional gas consumption provided in the above embodiments, characterized in that, the computer electronic device includes a memory and a processor.

The memory is configured to store a computer program.

The processor is configured to implement the method for predicting regional gas consumption according to the above embodiments when executing the computer program.

It is understandable that the memory may adopt a random access memory (RAM) or a non-volatile memory (NVM), such as at least one magnetic disk storage. Further, the storage medium may also be any medium capable of storing program codes, such as a USB flash drive, a mobile hard disk, a magnetic disk, or an optical disk.

It is understandable that the processor may be a general-purpose processor, including a central processing unit (CPU), a network processor (NP), etc., a digital signal processing (DSP) device, an application specific integrated circuit (ASIC), a field-programmable gate array (FPGA), or other components such as a programmable logic device, a discrete gate, a transistor logic device, and a discrete hardware component.

It should also be noted that a person having ordinary skill in the art can clearly understand that, for the convenience and brevity of description, the specific working process of the computer electronic device described above may refer to the corresponding method process in the aforementioned method embodiments, and description thereof is not repeated herein. In each embodiment provided by the present application, the division of steps in the device and method is merely a logical function division. There may be other division methods in actual implementation, for example, multiple steps may be combined or integrated together, and one step may also be split.

In addition, with the progress of the digital era of society, the intelligence and informatization of the natural gas industry are also developing rapidly, and the Internet of Things (NB-IOT) smart gas meters are gradually replacing traditional IC card gas meters. This type of Internet of Things smart gas meter has a communication module based on Internet of Things data transmission technology added inside. From a functional perspective, data may be uploaded in real time, making it convenient for gas companies to perform remote meter reading and online safety monitoring.

Based on the development needs of Internet of Things smart gas meters, based on the same invention concept, another preferred embodiment of the invention further provides an Internet of Things cloud platform corresponding to the system for predicting regional gas consumption provided in the above embodiments, so as to adapt to the needs of remote transmission, storage, and cloud-based processing of gas big data. The Internet of Things cloud platform needs to be used in together with the Internet of Things gas meter. The cloud platform receives, by means of Internet of Things technology, gas flow data uploaded by gas flow metering devices of all networked gas users and also provides an interface for interacting with the users for the outside. The cloud platform stores a computer program and executes the method for predicting regional gas consumption according to the above embodiments when the computer program is executed by a processor.

It should be noted that the specific type of the gas flow metering device is not limited, and generally a gas flow meter with an internal communication module based on the Internet of Things data transmission technology may be used. The gas flow metering device sends data to the server on the cloud platform through the Internet of Things technology. There are a large number of available technologies for the specific implementation of the Internet of Things technology, so description thereof is not provided herein.

Besides, it should also be noted that the Internet of Things cloud platform can provide corresponding interactive interfaces for gas dispatchers, government departments, gas equipment manufacturers, etc. The relevant user-end devices may remotely access the cloud platform server through a wired or wireless network to read or write the corresponding data. The user input module in the aforementioned prediction system may also be displayed in the user terminal device in the form of local software or a Web page. The specific form of the user terminal device is not limited and may be various forms such as a personal PC, a portable computer, a mobile terminal, etc. Users who need to access the cloud platform may call the prediction system in the cloud platform through their own user-end devices to implement the prediction function.

The above-described embodiments are only preferred solutions of the invention, but the embodiments are not intended to limit the invention. A person having ordinary skill in the art can also make various changes and modifications without departing from the spirit and scope of the invention. Therefore, any technical solutions obtained by equivalent substitution or equivalent transformation fall within the protection scope of the invention.

What is claimed is:

1. A method for predicting regional gas consumption, comprising:

acquiring a user-specified target region, in which a gas consumption needs to be predicted, and a prediction date;

according to target region, performing a spatial position matching on all gas users on basis of positions corresponding to all networked gas users, so as to obtain a set of the gas users which are located in the target region;

on basis of category labels of all the networked gas users that are stored in a database in advance, obtaining, by means of querying, the category labels of each of the gas users from among the set of the gas users, the category labels of the gas users in the database are generated in advance by clustering gas consumption characteristics of all the networked gas users, the gas consumption characteristics are composed of a first gas consumption distribution sequence on weekdays and a second gas consumption distribution sequence on holidays of the gas users, and all newly added networked gas users need to be assigned corresponding category labels through clustering in the database;

dividing all the gas users in the set of the gas users into user subsets according to category labels, wherein the gas users from among each of the user subsets have a same category label; and then, performing sampling on the gas users from among each of the user subsets, so as to accordingly obtain, for each of the user subsets, sample user sets which is capable of representing entire user subset;

for each of the sample user sets, according to the category labels corresponding thereto, calling a gas consumption prediction model, which is constructed and trained for this type of the gas users, so as to obtain a gas consumption prediction value of each of sample users from among the sample user sets on the prediction date, wherein the gas consumption prediction model is a Seq2Seq model based on a Long Short-Term Memory (LSTM) recurrent neural network model, its input is a time information encoding day sequence for multiple consecutive days before the prediction date, and its output is the gas consumption prediction value on the prediction date, wherein the time information encoding day sequence of any day is formed by fusion of a daily gas consumption distribution sequence of that day, first encoding information of which day of the week that day belongs to, and second encoding information of whether that day is a holiday, wherein a parameter matrix of the gas consumption prediction model is adjusted based the gas consumption characteristics; and averaging gas consumption prediction values of all the sample users from among each of the sample user sets on the prediction date, multiplying a mean value by total number of gas users from among the user subsets that corresponds to the sample user sets, so as to obtain a total gas consumption prediction value of all gas users from among each of the user subsets, summing up total gas consumption prediction values of all of the user subsets, and obtaining, by means of prediction, a total gas consumption of all gas users in the target region on the prediction date, wherein the gas consumption prediction model adopts the Seq2Seq model with an encoder-decoder structure, wherein an encoder part adopts a multi-layer first LSTM recurrent neural network model, the decoder part adopts a single-layer second LSTM recurrent neural network model, an attention layer cascaded between an encoder and a decoder is provided, a fully connected layer is cascaded after the decoder for output;

input of first LSTM recurrent neural network model is the time information encoding day sequence for the multiple consecutive days before the prediction date, wherein a model output of first LSTM recurrent neural network model and a hidden layer vector are inputted into the attention layer through an attention mechanism for the purpose of generating an attention weight, and the model output of the first LSTM recurrent neural network model is weighted by using the attention weight to obtain a context vector;

wherein the context vector is concatenated with the hidden layer vector of the first LSTM recurrent neural network model, wherein the concatenated of the context vector with the hidden layer vector of the first LSTM recurrent neural network model is inputted into second LSTM recurrent neural network model, wherein output of the second LSTM recurrent neural network model is concatenated with the context vector, wherein the concatenated of the context vector with the output of the second LSTM recurrent neural network model is inputted into the fully connected layer to obtain the gas consumption prediction value on the prediction date as final output of the gas consumption prediction model, wherein a gas scheduling for the target region is applied in advanced based on the gas consumption prediction value.

2. The method for the predicting regional gas consumption according to claim 1, wherein in acquiring the user-specified target region, the target region and the prediction date are input or specified through a Graphical User Interface (GUI) capable of human-computer interaction, and the target region is designated by an administrative division or by free selection on a map interface.

3. A computer electronic device, comprising a memory and a processor, wherein the memory is configured to store a computer program, and the processor is configured to implement a method for the predicting regional gas consumption according to claim 2 when executing the computer program.

4. The method for the predicting regional gas consumption according to claim 1, wherein when matching the set of gas users located in the target region, spatial topological calculation is required to be performed on point features corresponding to positions of all the gas users and a surface feature corresponding to the target region, and the point features intersecting with the surface feature are the gas users located in the target region.

5. A computer electronic device, in comprising a memory and a processor, wherein the memory is configured to store a computer program, and the processor is configured to implement a method for the predicting regional gas consumption according to claim 4 when executing the computer program.

6. The method for the predicting regional gas consumption according to claim 1, wherein the clustering is implemented using a K-means clustering algorithm, gas consumption distribution sequences of each of the gas users on all non-holidays are averaged and the gas consumption distribution sequences of each of the gas users on all holidays are averaged before the clustering, two average sequences are concatenated to serve as a distance characteristic of the gas users and are used to calculate a distance value between the gas users and a clustering center during a clustering process, so as to classify the gas users into a cluster with a closest distance.

7. The method for the predicting regional gas consumption according to claim 6, wherein the gas consumption distribution sequences are obtained by processing original data uploaded to a server by a gas flow metering device based on an Internet of Things technology, a time length of the gas consumption distribution sequence is 1 day, a sampling interval is 30 minutes to 2 hours, and each of sampling values represents a gas consumption of the gas users during the sampling interval.

8. A computer electronic device, comprising a memory and a processor, wherein the memory is configured to store a computer program, and the processor is configured to implement a method for the predicting regional gas consumption according to claim 6 when executing the computer program.

9. The method for the predicting regional gas consumption according to claim 1, wherein the gas consumption distribution sequences are obtained by processing original data uploaded to a server by a gas flow metering device based on an Internet of Things technology, a time length of the gas consumption distribution sequence is 1 day, a sampling interval is 30 minutes to 2 hours, and each of sampling values represents a gas consumption of the gas users during the sampling interval.

10. A computer electronic device, comprising a memory and a processor, wherein the memory is configured to store a computer program, and the processor is configured to implement a method for the predicting regional gas consumption according to claim 9 when executing the computer program.

11. The method for the predicting regional gas consumption according to claim 1, wherein sampling method is random sampling, stratified sampling, overall sampling, or systematic sampling.

12. A computer electronic device, comprising a memory and a processor, wherein the memory is configured to store a computer program, and the processor is configured to implement a method for the predicting regional gas consumption according to claim 11 when executing the computer program.

13. A computer electronic device, comprising a memory and a processor, wherein the memory is configured to store a computer program, and the processor is configured to implement a method for the predicting regional gas consumption according claim 1 when executing the computer program.

14. An Internet of Things cloud platform, wherein the cloud platform receives, by means of Internet of Things technology, gas flow data uploaded by gas flow metering devices of all the networked gas users and also provides an interface for interacting with the users for the outside, and the cloud platform stores a computer program and executes a method for the predicting regional gas consumption according to claim 1 when the computer program is executed by a processor.

* * * * *